United States Patent [19]

Hatta et al.

[11] 3,735,364

[45] May 22, 1973

[54] DATA HANDLING SYSTEM FOR HANDLING DATA IN COMPLIANCE WITH NORMAL AND SPECIAL DESCRIPTORS

[75] Inventors: Hiroshi Hatta; Yoshiteru Ishii, Tokyo, Japan

[73] Assignee: Nippon Electric Company, Tokyo, Japan

[22] Filed: June 2, 1971

[21] Appl. No.: 149,252

[30] Foreign Application Priority Data

June 3, 1970 Japan ....................45/47131

[52] U.S. Cl. ....................340/172.5

[51] Int. Cl. ....................G06f 9/20

[58] Field of Search ....................340/172.5

[56] References Cited

UNITED STATES PATENTS

| | | | |
|---|---|---|---|
| 3,546,677 | 12/1970 | Barton et al. | 340/172.5 |
| 3,597,745 | 8/1971 | Lahrson et al | 340/172.5 |
| 3,482,214 | 12/1969 | Sichel et al. | 340/172.5 |
| 3,431,558 | 3/1969 | Capozzi | 340/172.5 |
| 3,426,332 | 2/1969 | Cenfetelli | 340/172.5 |

*Primary Examiner*—Raulfe B. Zache
*Attorney*—Sandoe, Hopgood and Calimafde

[57] ABSTRACT

A computing system in accordance with the present invention processes data in compliance with an instruction and descriptor specified by respective instructions, each descriptor specifying a group of data having at least one characteristic. Each characteristic is composed of an invariable component and, sometimes also, a variable component. Each of the normal and special descriptors includes characteristic information specifying the invariable component. Each of the data and the descriptors includes a tag for determining whether the word is a datum or a normal or a special descriptor. Each instruction including the address of a descriptor further includes, if any, variable information specifying the variable component. The control unit comprises structure for deriving the characteristic from a read-out descriptor, means responsive to the variable information, if any, for modifying the derived characteristic, and means for handling the data in compliance with the unmodified or the so modified characteristic.

9 Claims, 4 Drawing Figures

DATA HANDLING SYSTEM FOR HANDLING DATA IN COMPLIANCE WITH NORMAL AND SPECIAL DESCRIPTORS

BACKGROUND OF THE INVENTION

This invention relates to data processing systems and, more specifically, to a system adapted to handle that data, each group of which has at least one common characteristic, in compliance with the instructions and the descriptors descriptive of the characteristics and specified by the respective instructions.

In the art of the data handling systems, the manner of handling data is usually described with a programming language and carried out in accordance with machine language into which the programming language is complied or otherwise interpreted by the system. The description of data processing may be classified into a description of operation, a description of the characteristics of the data, and a description of the value of the data. The operations may be arithmetic, logic, judging evaluation, transfer absolute or conditional, control, and the like. The characteristics may relate to either the word length or the data length, a decimal or binary expression of the data, decimal point location, and so on. The value of the data may either be the digital data or a combination of letters. On the other hand, data handling is carried out by executing the instructions directly on the data. The instruction may be an addition for fixed-point decimal data, a multiplication for floating-point binary data, and others. It follows therefore that the operation and the characteristics of the data must be coupled into a single instruction. This complicates compiling the programming language into machine language.

In order to avoid the foregoing complication, proposals have been put forward to separate the operation, the description of characteristics, and the data, even in machine language.

An application for patent is pending in Japan for a proposal of the type, wherein use is made of the instruction, the descriptors, and the data. The instruction specifies the operation and the address of at least one descriptor and may be, for example, "addition, address No. 100." The descriptor specifies the characteristics of a datum together with the address of the datum and may be, for example, "a decimal number, five digits, the point located two to the least significant digit, address No. 1,000." An instruction is carried out by finding the value of the datum with reference to the descriptor and by carrying out the operation specified by the instruction.

This proposal may appear defective in that the descriptors increase the frequency of access to the memory and require wider area of memory. It improves, the overall efficiency, however, because only one instruction is equivalent to a plurality of conventional instructions. Furthermore, in comparison with a convention system wherein it is necessary during execution of a program to select a combination of instructions for processing data whose characteristics can not be given beforehand but are given as a result of execution of some preceding instructions, the proposal enables the instructions to be kept invariant and the descriptors to be changed or modified together with the data during execution of the program, thereby raising the efficiency of operation and avoiding program complication of program.

It should be pointed out, however, that the proposal is not necessarily advantageous in processing for which a single conventional instruction is sufficient, and for which the characteristics of data are initially known. As a matter of fact, the descriptors bring about the redundancy to impair efficiency under these circumstances.

SUMMARY OF THE INVENTION

It is therefore an object of the present invention to provide a data handling system for handling data in compliance with the instructions and the descriptors specified by the respective instructions, wherein the redundancy brought about by the use of the descriptors is reduced to further improve the efficiency of the data handling system of the type.

Described in more detail, the data handling system of the type offered by the above-mentioned proposal makes use of the descriptors, each including the characteristic information specifying the characteristic shared by a data group. Each descriptor further includes the base address information of the data group in the main memory of the system. Each of the data and the descriptors includes a tag. Each instruction includes the absolute address information for a word in the main memory and the relative address information for a datum of the data group. The arithmetic-control unit of the system selects a word in compliance with the absolute address information, discriminates by means of the tag whether the selected word is a datum or a descriptor, carries out the arithmetic operation on the base address information and the relative address information, and carries out the operation specified by the instruction by selecting the datum in compliance with the resulting address obtained as a result of the arithmetic operation and with the characteristic information.

According to the instant invention, each of the characteristics for the respective ones of preselected data groups is divided into an invariable and a variable component. Accordingly, the descriptors are classified into normal and special descriptors for the characteristics without the variable components and with the variable components, respectively. For instance, normal descriptors are used to describe the characteristics 10, 11, and 12 (specifying, for example, the data length) as they are, while special descriptors are used when the characteristics are considered to consist of a common invariable component 10 and variable components 0, 1, and 2, respectively. Characteristics 0, 1, and 3 may be divided into a common invariable component 0 and the respective variable components 0, 1, and 3. The instructions including the absolute address information for the special descriptors descriptive of the characteristic having a common invariable component, further include the variable information specifying the variable components of the characteristic, respectively. For each normal descriptor, the arithmetic-control unit carries out data handling in the manner described in the preceding paragraph. For the special descriptors including common base address information, the arithmetic-control unit derives the resulting address mentioned in the preceding paragraph, modifies the characteristic information put in a work register and specifying the common invariant component by the variable information included in the respective instructions, and carries out the operation specified by the instruction by selecting the datum in compliance with the resulting address and with the characteristic information so modified. The tag is used to discriminate whether the descriptor is a normal or a special descriptor.

According to an aspect of the present invention, the instruction including the absolute address information for each normal descriptor further includes index register information, in place of the variable information included in the instruction for a special descriptor, specifying the index register, if any, to be used to modify the resulting address.

Figure 1:
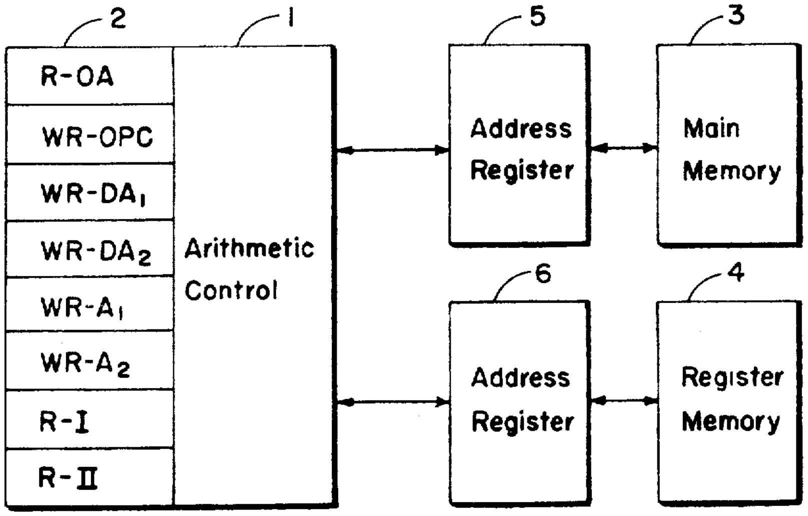
FIG. 1 is a schematic block diagram of data handling system to which the present invention is applicable.

DESCRIPTION OF THE PREFERRED EMBODIMENTS:

Referring to FIG. 1, a data handling system to which the instant invention is applicable comprises an arithmetic-control unit 1 having arithmetic registers 2, a main memory 3, a register memory 4 consisting of 16 registers, and address registers 5 and 6 therefor. The instructions and the data are stored in the main memory 3. The descriptors are stored in the register memory 4, although they may be stored in the main memory 3. The data stored in the main memory 3 is arranged in a block-like manner. Access to the data in each block may be obtained in compliance with the base address of the data block given in the descriptors specified, in turn, by a series of instructions and with the relative addresses of the remaining data given in the respective instructions. Preferably the base address of a data block is the least absolute address for the data in the data block. The data may also be stored in the register memory 4.

Figure 2:
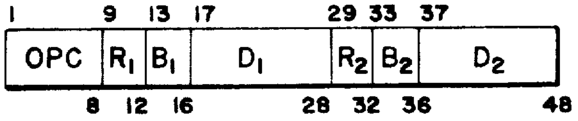
FIGS. 2, 3, and 4 show the formats of an instruction, a descriptor, and a datum, respectively.

Referring to FIG. 2, an instruction for two descriptors includes the following information:

- an operation code OPC (eight bits) specifying the operation, such as the arithmetic operation, the logical operation, judgment, transfer, judgment control, and the like,
- specific information R (four bits) which is, in the instruction for a special descriptor, the variable information specifying the variable component of the characteristic described by the special descriptor and, for the instruction for a normal descriptor, the index register information specifying one, if any, of the index registers that is to be used in modifying the address derived from the normal descriptor and the instruction therefor,
- absolute address information B (four bits) specifying the absolute address of the descriptor in the register memory 4, and
- relative address information D (12 bits) specify-ing the relative address of a datum in the data block identified by the later-described base address information L included in the descriptor.

The instruction may be of the single-, the three-, or the more-than-three-address code. In FIG. 2, the information for a first and a second descriptor is represented by suffixes 1 and 2, respectively. Although the index registers may be provided separately of the register memory 4, it is assumed that the modifiers are stored in the register memory 4 for the convenience of the following description.

Figure 3:
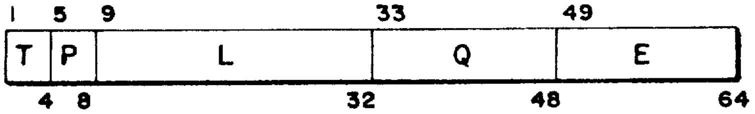

Referring to FIG. 3, a descriptor includes the following information:

- a tag T (four bits) specifying whether the descriptor is a normal or a special descriptor and discriminating the descriptors from the data in a manner such as
  - 0000 for normal descriptors,
  - 0001 for special descriptors,
  - 0010 for data,
  - ...,
- basic characteristic information P (four bits) specifying the base characteristic of the data group identified by the following base address information L in a manner such as
  - 0000 for fixed-length data,
  - 0001 for alphabetic data,
  - 0010 for digital data,
  - 0011 for fixed-point binary data,
  - 0100 for floating-point binary data,
  - 0101 for fixed-point decimal data,
  - 0111 for floating-point decimal data,
  - ...,
- base address information L (24 bits) specifying the base address of the data block in the main memory 3, which is the absolute address of, preferably, the datum having the least absolute address,
- quantitative characteristic information Q (16 bits) specifying, in cooperation with the basic characteristic information P, such quantitative characteristic of the data group identified by the base information L, as
  - the data length in bytes for alphabetic data,
  - the data length for binary data,
  - the data length and the location of the point for fixed-point binary data,
  - the length for floating-point binary data,
  - the data length and the location of the decimal point for fixed-point decimal data,
  - the data length for floating-point decimal data,
  - ..., and
- information for monitoring E (16 bits) representing the number of data in the group identified by the base address information L (operation of the data handling system is monitored by checking whether the relative address specified by the relative address information D of a data group is not greater than the number represented by the monitoring information E for the data group).

Figure 4:
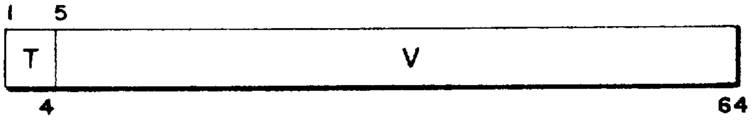

Referring to FIG. 4, a datum includes the following information:

- a tag T (four bits) mentioned with reference to FIG. 3 but preferably further specifying such basic characteristic of the datum as
  - fixed-point binary,
  - floating-point binary,
  - logical,
  - ..., and
- datum V.

Referring again to FIG. 1, the arithmetic registers 2 include the following registers:

- an instruction address register R-OA to be loaded with the absolute address of an instruction,
- an instruction register WT-OPC to be loaded with an instruction,
- data address work register $WR\text{-}DA_1$ and $WR\text{-}DA_2$ to be loaded with the base addresses specified by the base address information L, which are processed with the relative addresses specified by the relative address information D to derive the absolute addresses of the operands, respectively, quantitative characteristic work registers $WR-A_1$ and $WR-A_2$ to be loaded with the quantitative characteristic information Q of the respective operands, which may be processed with the variable information included in special descriptors, and operand registers R-I and R-II to be loaded with the first and the second operands, respectively.

The number of bits for each information may be selected in accordance with the scale of the particular data handling system. For example, the number of bits for each of the absolute address information B and the index register information is selected in correspondence to the number of the registers in the register memory 4. The base address of a data block may be the absolute address of a datum in the data block which appears first in the program, with modification to the process for monitoring. The preferred type of the tag T of a datum makes it possible, when the data is also stored in the register memory 4, to process the data without referring to the descriptors. Access to the main memory 3 may be obtained on a byte basis.

As soon as execution of an instruction is finished, the arithmetic-control unit 1 detects a signal indicative of such completion, selects the next instruction from the main memory 3 in compliance with the absolute address stored the instruction address register R-OA, and loads the instruction register WR-OPC with the selected instruction. The arithmetic-control unit 1 extracts the absolute address information $B_1$ for the first operand from the instruction register WR-OPC, selects the register in the register memory 4 which is specified by the absolute address information $B_1$, and loads the first operand register R-I with the content of the selected register. The arithmetic-control unit 1 next determines whether the word put in the first operand register R-I is a normal or a special descriptor or a datum.

OPERATION FOR NORMAL DESCRIPTORS.

When the tag T of the word put in the first operand register R-I is "0000," the arithmetic-control unit 1 extracts the base address information $L_1$ from the first operand register R-I, loads the first data address work register $WR-DA_1$ with the base address information $L_1$, and sums or otherwise processes the base address information $L_1$ with the relative address information $D_1$ for the first operand extracted from the instruction register WR-OPC to load the data address work register $WR-DA_1$ with the resulting address. The arithmetic-control unit 1 extracts the quantitative characteristic information $Q_1$ from the first operand register R-I and loads the first quantitative register $WR-A_1$ with the extracted quantitative characteristic information $Q_1$. The arithmetic-control unit 1 selects a register in the register memory 4 in compliance with the index register information extracted from the instruction register WR-OPC and determines the tag T of the word contained in the selected register.

When the tag T of the word contained in the selected register is either "0010" or specifies a basic characteristic of the datum V included in the word, the arithmetic-control unit 1 modifies the resulting address with the modifier given by the datum V to load the data address work register $WR-DA_1$ with the absolute address in the main memory 3 of the required word. When the tag T is "0000," the arithmetic-control unit 1 generates the normal descriptor read out from the selected register to replace the previous normal descriptor put in the first operand register R-I, and repeats the processing discussed in the preceding paragraph until the word contained in the selected register eventually becomes a word including the datum V, to load the operand register R-I, the data address work register $WR-DA_1$, and the quantitative characteristic work register $WR-A_1$ ultimately with the normal descriptor, the absolute address of the required word, and the quantitative characteristic information $Q_1$ for the required word, respectively.

The arithmetic-control unit 1 carries out similar operation for the second operand defined by the instruction.

It is now assumed that the operation code OPC extracted from the instruction register WR-OPC specifies "transfer" and that the basic characteristic information $P_1$ and $P_2$ contained in the first and the second operand registers R-I and R-II, respectively, is "0001." The arithmetic-control unit 1 reads a letter from the main memory 3 at the absolute address given in the first data address work register $WR-DA_1$, stores the letter in the main memory 3 at the corresponding byte position of the absolute address given in the second data address work register $WR-DA_2$, subtracts one from each of the contents of the data address work registers $WR-DA_1$ and $WR-DA_2$ and of the quantitative characteristic work registers $WR-A_1$ and $WR-A_2$, and checks whether each of the contents of the work registers $WR-DA_1$, $WR-DA_2$, $WR-A_1$, and $WR-A_2$ has thereby become zero. The arithmetic-control unit 1 repeats the operation until the contents of at least one of the work registers WR-DA and WR-A becomes zero, when execution of the instruction is completed.

OPERATION FOR SPECIAL DESCRIPTORS.

When the tag T of the word contained in the first operand register R-I is "0001," the arithmetic-control unit 1 operates in the manner described in the former portion of the first paragraph of "Operation for Normal Descriptors," to load the first data address work register $WR-DA_1$ with the resulting address. The arithmetic-control unit 1 now extracts the basic characteristic information $P_1$ from the first operand register R-I, discriminates the information $P_1$, extracts the quantitative characteristic information $Q_1$ from the first operand register R-I, and loads the first quantitative characteristic work register $WR-A_1$ with the quantitative characteristic information $Q_1$. The arithmetic-control unit 1 extracts the variable information from the instruction register WR-OPC and sums or otherwise processes the quantitative characteristic information $Q_1$ with the variable information to load the first quantitative characteristic work register $WR-A_1$ with the resulting quantitative characteristic information, which is an exact equivalent for the unprocessed quantitative characteristic information $Q_1$ used in operation for a normal descriptor.

By virtue of the special descriptor and the instructions therefor, it is possible to derive a series of quantitative characteristics by merely processing the same quantitative characteristic information Q included in a special descriptor defined by an instruction, with the variable information included in the successive instructions. For example, it is assumed that the basic and the quantitative characteristic information P and Q of a special descriptor specify the data length and a value of 50, respectively, and that the variable information included in the successive instructions specify 1, 3, 6, 2, 4, 5, and 0, respectively. The data lengths 51, 53, 56, 52, 54, 55, and 50 are successively obtainable without loading the operand register R-I or R-II with different discriptors on executing the individual instructions.

More particularly, it is now assumed that ten fixed-point decimal data items having data lengths of 1, 2, 3, 4, 5, 6, 7, 8, 9, and 10 bytes (one byte for each digit) are stored in the main memory 3 starting from the addresses Nos. 0, 1, 3, 6, 10, 15, 21, 28, 36, and 45, respectively, and that a program contains ten successive instructions, each having the word length of six bytes as shown in FIG. 1 and specifying addition of the corresponding datum to the content of a working area of 11 bytes.

With normal conventional descriptors, it is indispensable that 10 eight-byte descriptors for the respective data and an additional descriptor for the working area be provided. Ten descriptors for the respective data are too much to be stored in the register memory 4 because data other than such descriptors are inevitably stored therein. It follows therefore that the 10 descriptors for the respective data are stored in the main memory 3 and that only the descriptors for the 10 descriptors and for the working area are stored in the register memory 4, the access to the 10 descriptors being attained through index modification. As a result, the memory area required in the main memory 3 is 60 bytes for the instructions, 80 bytes for the 10 descriptors, 55 bytes for the data, and 11 bytes for the working area, amounting to 206 bytes. The addresses of the data are given by successively loading the operand register R-I or R-II with the respective descriptors and processing the base address information L (which specifies No. 0) extracted from the respective descriptors, with the relative address information D (which specify 0, 1, 3, 6, 10, 15, 21, 28, 36, and 45) extracted from the respective instructions. Access to the main memory 3 for such data is attained by the respective addresses (Nos. 0, 1, 3, 6, 10, 15, 21, 28, 36, and 45) of the data, the basic characteristic information P extracted from the respective descriptors, and the quantitative characteristic information Q (which specify 1, 2, 3, 4, 5, 6, 7, 8, 9, and 10) extracted from the respective instructions. Assuming that the access to the main memory 3 is achieved on a byte basis, the frequency of access is 60 times for the instructions, 80 times for the descriptors, and 275 ($= 55 + 11 \times 10 \times 2$) times for the data, amounting to 415 times.

With a special descriptor according to the instant invention, it is possible to execute the instructions with only one special descriptor for the data and an additional special descriptor for the working area. These special descriptors are stored in the register memory 4. The memory area required for execution of the instructions is therefore 60 bytes for the instructions, 55 bytes for the data, and 11 bytes for the working area, amounting to as less as 126 bytes. The addresses of the data are given by only loading the operand register R-I or R-II once with the special descriptor for the data and processing the base address information L (which specifies No. 0) extracted from the only one special descriptor with the relative address information D (which specify 0, 1, 3, 6, 10, 15, 21, 28, 36, and 45) extracted from the respective instructions. Access to the main memory 3 is achieved by the respective addresses (Nos. 0, 1, 3, 6, 10, 15, 21, 28, 36, and 45) of the data, the common basic characteristic information P extracted from the single special descriptor, and the quantitative characteristic information derived from the quantitative characteristic information Q (which specifies 0) extracted from the sole special descriptor and the variable information (which specify 1, 2; 3, 4, 5, 6, 7, 8, 9, and 10) given by the respective instructions. The frequency of access is 60 times for the instructions and 275 times for the data, amounting only to 335 times.

When the working area is contiguous with the memory area for the data (namely, addresses Nos. 55–65 following the data area of the addresses Nos. 0–54), it is possible to use the same special descriptor for both the data and the working area.

It will now be appreciated that the variable information of about four bits for the variable components of the quantitative characteristic, markedly raises the efficiency of a data handling system, both in the memory area and with respect to operation time. Further, an instruction of the two-address code can either identify a special and a normal descriptor or two special descriptors. The variable component may further be divided into two or more variable components, which are variable either independently or simultaneously. For example, it is possible to make the first through the fourth bits and the fifth and the sixth bits of the quantitative characteristic information Q of a special descriptor specify the data length and the location of point, respectively, and to make the first and the second bits and the third and the fourth bits of the variable information specify, when used for addition to the third and the fourth bits and the fifth and the sixth bits of the quantitative characteristic information Q, respectively, the algebraic increments of the word length within four digits and the shift of the decimal point within four successive places, respectively. The operation for the quantitative characteristic information Q and the variable information may be subtraction, multiplication, logical operation, or any other operation. Finally, the resulting quantitative characteristic information as identified hereinabove may be derived solely from the variable information, in which case it should be understood that the quantitative characteristic information Q of the special descriptors specifies nothing.

The above described apparatus is merely illustrative of the principles of the present invention. Modifications and adaptation thereof will be readily apparent to those skilled in the art without departing from the spirit and scope of the present invention.

What is claimed is:

1. A method for processing data in computing apparatus in compliance with instructions and the descriptors stored therein, said data being classified into at least one group, the data of each said group having characteristics comprising at least one invariable component and one variable component, said descriptors including information specifying said invariable data group characteristic components, said instructions including information specifying said variable data group characteristic components, comprising the steps of:

selecting a descriptor in compliance with each said instruction, carrying out an arithmetic operation between the invariable information included in the selected descriptor and the variable information included in the instruction in compliance with which the descriptor is selected, to derive the resulting characteristic information, and handling the data in compliance with the resulting characteristic information and the instruction in compliance with which the descriptor is selected to derive the resulting characteristic information.

2. A method as claimed in claim 1, for further processing additional data in compliance with further instructions and further descriptors, said additional data being classified into at least one group, said additional data having variable characteristics, said further descriptors including characteristic information specifying said variable characteristics, comprising the steps of:

selecting a further descriptor in compliance with each said further instruction, determining whether the selected descriptor is one of said descriptors or one of said further descriptors, and processing the additional data, when the selected descriptor is determined to be one of said further descriptors, in compliance with the characteristic information included in the selected further descriptor and the further instruction in compliance with which the further descriptor is selected.

3. A data processing system for processing data in compliance with instructions and descriptors, said data being classified into at least one group, the data of each said group having characteristics comprising at least one invariable component and at least one variable component, said descriptors including information specifying said invariable components, said instructions including information specifying said variable components, comprising:

descriptor address means responsive to selection of each said instruction for selecting a descriptor in compliance with said instruction, arithmetic operation means coupled to said descriptor address means and responsive to selection of each said instruction for executing the arithmetic operation on the invariable information included in the selected descriptor and the variable information included in the instruction in compliance with the descriptor selected, to derive the resulting characteristic information, and data handling means coupled with said arithmetic operation means and responsive to each said instruction, for processing said data in accordance with the resulting characteristic information and the instruction in compliance with which the descriptor is selected to derive the resulting characteristic information.

4. A data handling system as claimed in claim 3, further comprising:

memory means having a plurality of addresses capable of storing said data and said descriptors, said data being stored according to said groups, group address means, coupled with said descriptor address means and responsive to a descriptor selected thereby for specifying a group of the data determined by the selected descriptor, and relative address means, coupled with said memory means and said group address means and responsive to each said instruction, for selecting data stored in said memory means in the group specified by said group address means, said descriptor address means being coupled with said memory means to select a descriptor stored therein, said data handling means being coupled with said relative address means to process the data selected by said relative address means.

5. A data handling system as claimed in claim 4, wherein said memory means comprises a group address information and an invariable information field at each said address where, when a descriptor is stored in said memory means at an address, the group address information and the invariable information included in the last-mentioned descriptor is stored, and means coupling said descriptor address means with the respective group address information and invariable information fields.

6. A data handling system as claimed in claim 4, wherein said descriptor address means comprises an operand register loaded with the selected descriptor, said arithmetic operation means comprises a characteristic work register loaded with the invariable information for which the resulting characteristic information is subsequently substituted, said group address means comprises a data address work register loaded with the group address information included in the selected descriptor, said group address information specifying the group including the data to be processed by said data processing means, and said relative address means comprises means for arithmetically operating on the group address information contained in said data address work register by the relative address information included in the instruction, said relative address information specifying the data to be handled by said data handling means.

7. A data handling system as claimed in claim 3, further comprising means for processing additional data in compliance with further instructions and further descriptors, said further data being classified into at least one further group, said further data having variable characteristics, said further descriptors including the characteristic information specifying said variable characteristics, respectively, wherein said descriptor address means is further responsive to each said further instruction to select a further descriptor in compliance with the further instruction, tag means is coupled with said descriptor address means to determine whether the descriptor word selected by said descriptor address means is one of the first-mentioned descriptors or one of said further descriptors, said arithmetic operation means if further coupled with said tag means to carry out said arithmetic operation when the selected descriptor word is determined to be one of the first-mentioned descriptors, and said data handling means is further coupled with said descriptor address means and said tag means and further responsive to each said further instruction to process the datum in the manner defined in claim 6 when the selected descriptor word is determined to be one of the first-mentioned descriptors and to process, when the selected descriptor word is determined to be one of said further descriptors, further data in compliance with the characteristic information included in the selected further descriptor and the further instruction in compliance with which the further descriptor is selected.

8. A data handling system as claimed in claim 7, comprising memory means having a plurality of addresses capable of storing said data, said further data, said descriptors, and said further descriptors, said memory means having a tag information and an invariable information field at each said address, said tag information field storing the tag information included in one of said data, said further data, said descriptors, and said further descriptors that is stored in said memory means at the address, said tag information specifying whether the word including the tag information is one of said data and said further data, or one of the first-mentioned descriptors, or one of said further descriptors, said invariable information field storing the invariable information and the characteristic information when a first-mentioned descriptor and a further descriptor are stored in said memory means at the address, respectively, said tag means being further coupled with the respective tag information field to determine the tag information of the word selected by said descriptor address means, said arithmetic operation means being further coupled with the respective invariable information fields through said descriptor address means to carry out said arithmetic operation when the word selected by said descriptor address means is determined to be one of the first-mentioned descriptors, said data handling means being further coupled with the respective invariable information fields through said descriptor address means to process the additional data.

9. A data handling system as claimed in claim 8 further comprising:

an instruction register loaded with one of said instructions and one of said further instructions and including word address information, variable information, and a relative address information field loaded with the word address information, the variable information, and the relative address information included in said one instruction, said memory means storing the first-mentioned and said further data according to the first-mentioned and said further groups, and having a group address information field at each said address for storing the group address information included in one of the first-mentioned and said further descriptors that is stored in said memory means at the address, said descriptor address means being coupled with said memory means and said word address information field to select a word specified by the word address information of said one instruction, group address means coupled with the respective group address information fields and said descriptor address means and responsive to the group address information included in the selected word that is determined to be one of the first-mentioned and said further descriptors for specifying a group of the data determined by the selected one of the first-mentioned and said further descriptors, and relative address means, coupled with the respective addresses of said memory means, said group address means, and said relative address information field, for selecting data stored in said memory means in the group specified by said group address means at the address determined by the relative address information included in said one instruction.

* * * * *